US006703552B2

(12) United States Patent
Haken

(10) Patent No.: US 6,703,552 B2
(45) Date of Patent: Mar. 9, 2004

(54) CONTINUOUS MUSIC KEYBOARD

(76) Inventor: Lippold Haken, 1906 Augusta Dr, Champaign, IL (US) 61821

(*) Notice: Subject to any disclaimer, the term of this patent is extended or adjusted under 35 U.S.C. 154(b) by 0 days.

(21) Appl. No.: 09/908,561

(22) Filed: Jul. 19, 2001

(65) Prior Publication Data

US 2003/0015087 A1 Jan. 23, 2003

(51) Int. Cl.[7] .............................. G01P 3/00; G10H 5/00

(52) U.S. Cl. ............................ 84/658; 84/615; 84/653; 84/718; 84/743; 84/423 R; 84/424; 84/439

(58) Field of Search ........................... 84/600, 609–612, 84/615–617, 622–625, 645, 649–652, 653–655, 658–660, 718–720, 743–745, 423 R, 424, 439

(56) References Cited

U.S. PATENT DOCUMENTS

| | | | | |
|---|---|---|---|---|
| 3,626,350 A | | 12/1971 | Suzuki et al. | |
| 4,341,141 A | | 7/1982 | Deutsch et al. | |
| 4,384,503 A | * | 5/1983 | Gunn | 84/653 |
| 4,558,623 A | | 12/1985 | Buchla | |
| 4,810,992 A | | 3/1989 | Eventoff | |
| 4,972,752 A | | 11/1990 | Van Duyne | |
| 5,008,497 A | | 4/1991 | Asher | |
| 5,079,536 A | | 1/1992 | Chapman | |
| 5,398,585 A | * | 3/1995 | Starr | 84/646 |
| 5,619,003 A | * | 4/1997 | Hotz | 84/615 |
| 5,741,990 A | * | 4/1998 | Davies | 84/423 R |
| 5,917,180 A | | 6/1999 | Reimer et al. | |

OTHER PUBLICATIONS

R. Moog, "A Multiply Touch–Sensitive Clavier for Computer Music," Proc. 1982 Int. Computer Music Conf., Int. Computer Music Assoc., San Francisco, pp. 155–159, 1982.
J. M. Snell, "Sensors for Playing Computer Music with Expression," Proc. 1983 Int. Computer Music Conf., Int. Computer Music Assoc., San Francisco, pp. 113–126, 1983.

D. Keislar, "History and Principles of Microtonal Keyboards," Computer Music J., vol. 11, No. 1, pp. 18–28, 1987.

H. Fortuin, "The Clavette: A Generalized Microtonal MIDI Keyboard Controller," Proc. 1995 Int. Computer Music Conf., Int. Computer Music Assoc., San Francisco, p. 223, 1995.

E. Johnstone, "The Rolky: A Poly–Touch Controller for Electronic Music," Proc. 1985 Int. Computer Music Conf., Int. Computer Music Assoc., San Francisco, pp. 291–295, 1985.

L. Haken, E. Tellman, and P. Wolfe, "An Indiscrete Music Keyboard," Computer Music J., vol. 22, No. 1, pp. 30–48, 1998.

L. Haken, R. Abdullah, and M. Smart, "The Continuum: A Continuous Music Keyboard," CERL Sound Group, Electrical and Computer Engineering, University of Illinois, Urbana, Illinois, 61801.

* cited by examiner

*Primary Examiner*—Marlon T. Fletcher
(74) *Attorney, Agent, or Firm*—Brinks Hofer Gilson & Lione

(57) ABSTRACT

An apparatus and method for continuous keyboard system. The Continuous Music Keyboard resembles a traditional keyboard in that it is approximately the same size and is played with ten fingers. It also resembles a fretless string instrument in that it has no discrete pitches; any pitch and any tuning may be played, and finger movements produce smooth glissandi and vibrato. The Continuous Music Keyboard comprises a plurality of rods, each of which has a magnet on each end. The displacement of each rod is measured through mounted Hall-Effect sensors. The sensor values are then analyzed to identify the three-dimensional location of the fingers depressing upon a control surface. Additionally, predictive analysis is conducted on values collected to identify whether a new depression on the control surface has occurred, or rather if a previously placed finger is simply moving alone the Continuous Music Keyboard.

20 Claims, 11 Drawing Sheets

CONTINUOUS MUSIC KEYBOARD

RELATED APPLICATIONS

The present application claims priority to provisional application No. 60/294,038, filed on May 29, 2001.

BACKGROUND

The present invention, the Continuous Music Keyboard, can track the left-to-right and front-to-back position, and the pressure, of each of 10 fingers simultaneously touching its control surface. Unlike a traditional music keyboard, the Continuous Music Keyboard has no discrete keys; it has a single continuous polyphonic control surface. Any pitch and any tuning may be played by properly placing fingers on the control surface. Finger movements produce smooth glissandi, crescendi, and vibrato. The Continuous Music Keyboard also tracks front-to-back position of each finger, providing another dimension of continuous control for the performer. Its output can be used to control any synthesis technique.

Modern electronic music keyboards allow the performer to use key velocity and aftertouch to control sound synthesis. Some keyboards provide a polyphonic aftertouch, which allows the performer continuous control over each individual note in a chord (as in Buchla's invention U.S. Pat. No. 4,558,623, December 1985). These capabilities are extended by certain experimental keyboards, such as Moog's clavier (R. Moog, "A Multiply Touch-Sensitive Clavier for Computer Music," *Proc.* 1982 *Int. Computer Music Conf.*, Int. Computer Music Assoc., San Francisco, pp. 155–159, 1982). Moog's clavier measures not only pressure aftertouch, but also other parameters including the exact horizontal and vertical location of each finger on its keyboard key. Suzuki invented a variable resistor strip for music keyboards (U.S. Pat. No. 3,626,350, February 1970). Asher invented a touch strip for position and pressure (U.S. Pat. No. 5,008,497, Apr. 1991). Chapman invented a pressure transducer for musical instrument control (U.S. Pat. No. 5,079,536, January 1992). All of these inventions result in keyboards divided into a plurality of keys; in contrast, the Continuous Music Keyboard does not have discrete keys, but rather consists of one continuous polyphonic control surface.

Snell proposed a keyboard with the standard layout, but with the black keys sloping down at the rear to a flat plane where pitch would be continuous, as on a ribbon controller (J. M. Snell, "Sensors for Playing Computer Music with Expression," *Proc.* 1983 *Int. Computer Music Conf.*, Int. Computer Music Assoc., San Francisco, pp. 113–126, 1983). Keislar proposed the use of a planar controller for implementing a microtonal keyboard, in which spaces between constant-pitch "keys" could optionally be used for continuous pitch (D. Keislar, "History and Principles of Microtonal Keyboards," *Computer Music J.*, vol. 11, no. 1, pp. 18–28, 1987). Fortuin presented a planar controller, built at STEIM and the Institute of Sonology, used as a two-dimensional microtonal keyboard (H. Fortuin, "The Clavette: A Generalized Microtonal MIDI Keyboard Controller," *Proc.* 1995 *Int. Computer Music Conf.*, Int. Computer Music Assoc., San Francisco, p. 223, 1995). Translucent overlays are placed on the controller to change the keyboard layout, allowing different sorts of scales with discrete pitches. Van Duyne invented a microtonal keyboard based on key clusters (U.S. Pat. No. 4,972,752, November 1990). Starr invented a fingerboard for guitar-shaped musical instruments (U.S. Pat. No. 5,398,585, Mar. 1995). In contrast to all these devices that have a plurality of keys or switches, the Continuous Music Keyboard allows the performer to play in any microtonal tuning using one uniform continuous polyphonic control surface.

Johnstone invented a device that optically tracks finger positions on a glass surface (E. Johnstone, "The Rolky: A Poly-Touch Controller for Electronic Music," *Proc.* 1985 *Int. Computer Music Conf.*, Int. Computer Music Assoc., San Francisco, pp. 291–295, 1985). In contrast, the Continuous Music Keyboard uses magnetic sensing to track fingers on a cloth-covered control surface.

Deutsch and Deutsch invented the Portamento Keyboard, which allows polyphonic sliding portamento (U.S. Pat. No. 4,341,141, July 1982). This device is based on an array of keyswitches to track the finger positions. In contrast, the Continuous Music Keyboard uses magnetic sensing to track the fingers, and the Continuous Music Keyboard tracks the front-to-back position of each finger.

Eventoff invented a pressure-sensitive digitizer pad (U.S. Pat. No. 4,810,992, March 1989). This can detect exact position and pressure of a force applied at any one point on the control surface. In contrast, the Continuous Music Keyboard tracks many fingers simultaneously pressing on the control surface.

TacTex corporation distributes a multiply-touch sensitive touch pad utilizing optical fiber pressure sensing technology (U.S. Pat. No. 5,917,180, June 1999, Reimer and Danisch). This pad is used as an electronic music controller, but it has a much smaller touch surface than a traditional music keyboard. In contrast, the Continuous Music Keyboard is the size of a traditional keyboard, and utilizes magnetic, not optic, sensing.

The Continuous Music Keyboard is my alternative to traditional MIDI keyboards. I previously invented other continuous devices (L. Haken, E. Tellman, and P. Wolfe, "An Indiscrete Music Keyboard," *Computer Music J.*, vol. 22, no. 1, pp. 30–48, 1998). The present invention differs in many essential ways from my previous inventions. My previous inventions (1) lacked pitch and amplitude detection accuracy, (2) produced pitch aberrations when tracking perfectly smooth glissandi, (3) could not track fast finger movements, (4) could not track short staccato notes, (5) could not withstand normal use because internal parts wore out. The present invention corrects these problems with new mechanical arrangement and new algorithms.

SUMMARY

The present invention, the Continuous Music Keyboard, is my alternative to a traditional MIDI keyboard. It is a new music performance device that allows the performer more continuous control than that offered by a traditional MIDI keyboard. It resembles a traditional keyboard in that it is approximately the same size and is played with ten fingers. Like keyboards supporting MIDI's polyphonic aftertouch, it continually measures each finger's pressure. It also resembles a fretless string instrument in that it has no discrete pitches; any pitch and any tuning may be played, and smooth glissandi are easily produced.

The Continuous Music Keyboard tracks an X, Y, Z position for each finger pressing on its control surface. The output of the Continuous Music Keyboard can be used to control any synthesis technique. Because of its continuous three-dimensional nature, the output of the fingerboard works especially well with sound morphing and cross-synthesis.

The X (side-to-side) position of each finger provides continuous pitch control for a note. In the most common configuration of the Continuous Music Keyboard, one inch in the X direction corresponds to a pitch range of 160 cents, and one octave is approximately the same size as an octave on a traditional piano keyboard. The performer must place fingers accurately to play in any particular tuning and can slide or rock fingers for glissando and vibrato.

The Z (pressure) position of each finger provides dynamic control. The performer produces tremolo by changing the amount of finger pressure. An experienced performer may simultaneously play a crescendo and decrescendo on different notes.

The Y (front-to-back) position of each finger provides timbral control for each note. By sliding fingers in the Y direction while notes are sounding, the performer can create timbral glides.

Depending upon the timbres generated by the sound synthesizer used with the Continuous Music Keyboard, the Y position can have a variety of effects. One possibility is to configure a sound synthesizer so that the Y position on the Continuous Music Keyboard corresponds to the bowing position on a string instrument, where bowing near the fingerboard produces a mellower sound and bowing near the bridge produces a brighter sound. Another possibility is to select source timbres so that Y position morphs between timbres of different acoustic instruments. The performer can bring out certain notes in a chord not only by playing them more loudly, as on a piano, but also by playing them with a different timbral quality.

The Continuous Music Keyboard comprises a flat control surface substantially the same size as a conventional music keyboard. Under the control surface is an array of thin rods that are mounted to a chassis. Springs are mounted near the ends of each rod. The rod is machined with a hole to accept the spring. This ensures that the springs are not overcompressed, even under excessive finger pressure. The rods are held in place with regularly-spaced in-line pins, utilizing a pair of pins near each rod, one pin between the rod and its neighbor and the other extending through a hole in the rod. The pins between the rods are subsequently referred to as "between rods posts." The pins extending through a hold in the rod are subsequently referred to as "through rod posts."

The apparatus may also include cover material for the rods, which is mounted on a bracket that can be easily removed for replacement. This material may comprise synthetic velvet. The continous music keyboard playing surface may also display a pattern based on the black and white key ordering of a piano as a pitch reference for the performer.

When a finger presses down on the control surface, one or more rods are displaced vertically (in the Z-plane). Which rods are displaced depends on the left-to-right position (X value) of the finger. The vertical (Z-plane) displacement of each end of each rod depends on the front-to-back position (Y value) and pressure (Z value) of the finger.

The displacement of each end of each rod is measured through the use of magnets and Hall-Effect sensors. Magnets are mounted at each end of each rod and Hall-Effect sensors are mounted on the chassis. When the end of the rod is displaced vertically, the mounted magnet is displaced in kind. The displacement of the magnet is measured by a Hall-Effect sensor. In a presently preferred embodiment, the sensors are mounted on the chassis such that the plane of the face of each sensor is in parallel with the line between the poles of a corresponding magnet. These values may then be collected and analyzed by a software package.

In the presently preferred embodiments. the software is operable to track the left-to-right, front-to-back, and pressure of each of 10 fingers simultaneously pressing on the surface. The software can then convert the finger position and pressure data into pitch, volume and timbre information, which can be communicated to standard electronic musical instruments. In a presently preferred embodiment, the pressure and left-to-right position is determined by the maximum point of a vertical parabola drawn through a peak rod value and its two neighboring rod values (a rod value is proportional to the total measured pressure exerted on a rod). The front-to-back position is computed from the ratio of two end sums taken to a fractional power, where an end sum is the sum of a service of a service of sensor values corresponding to magnets proximate to an end of the playing surface. The software in the presently preferred embodiments also includes predictive position analysis based on previous finger position and motion direction and speed.

DETAILED DESCRIPTION OF THE PRESENTLY PREFERRED EMBODIMENTS

Figure 1:
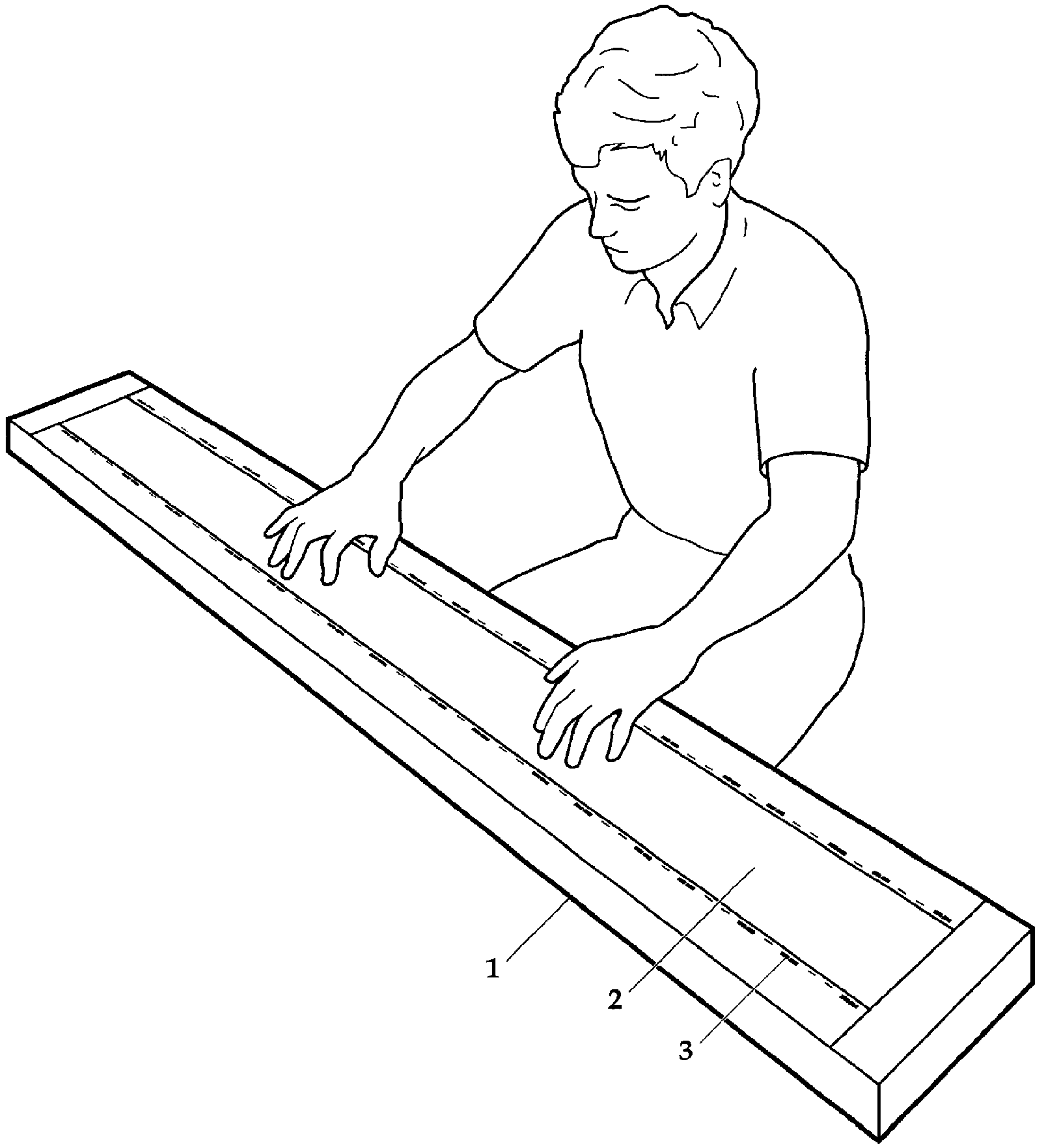
FIG. 1—A performer playing the Continuous Music Keyboard. The position, pressure, and movement of the performer's fingers are tracked on the control surface.

FIG. 1 shows a performer playing the Continuous Music Keyboard. The Continuous Music Keyboard 1 has approximately the same dimensions as a traditional keyboard. The performer presses down on the control surface 2. The Continuous Music Keyboard tracks the right-to-left and front-to-back position and movement of each of the fingers pressing on the control surface. The finger position and pressure information can be used to control a sound synthesizer in a variety of ways. Most commonly, the right-to-left position is used to control the pitch of notes, the pressure is used to control the dynamics (loudness), and the front-to-back position is used to control some other timbral aspect of the sound (such as brightness). The pattern 3 on the frame of the device is based on the black and white key ordering on a traditional piano keyboard; it serves as a pitch reference for the performer.

Figure 2:
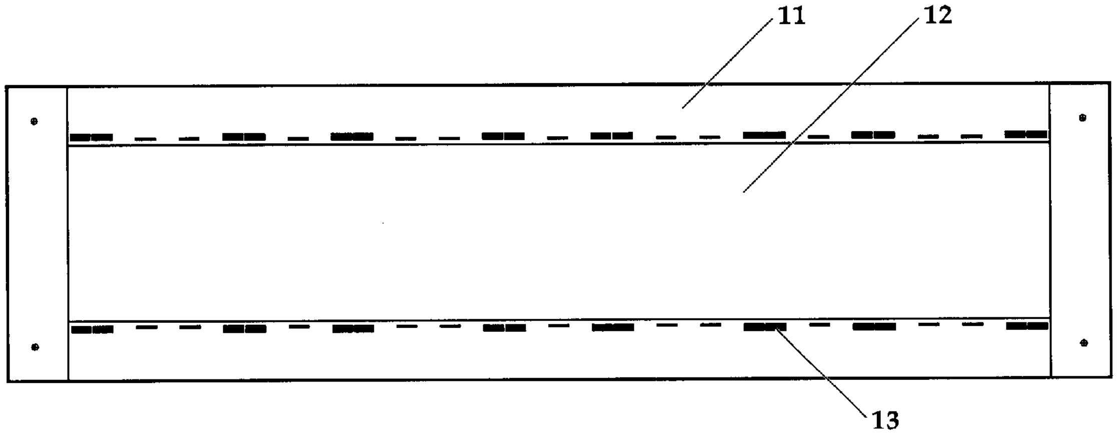
FIG. 2—A top view of a small-size Continuous Music Keyboard.
Figure 3:
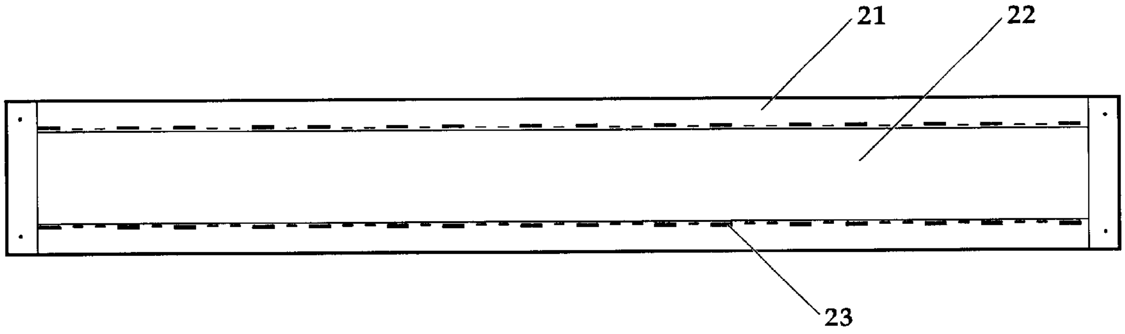
FIG. 3—A top view of a full-size Continuous Music Keyboard.

FIG. 2 and FIG. 3 show two sizes of the Continuous Music Keyboard. In FIG. 2, the control surface 12 provides a 4600-cent pitch range (nearly four octaves) when the right-to-left finger positions are interpreted as pitch with standard music keyboard pitch spacing. The frame 11 is approximately the same size as a 46-key standard electronic music keyboard. The pattern drawn on the frame 13 serves as a pitch reference; the pattern repeats nearly four times, corresponding to the nearly four-octave range assuming standard music keyboard pitch spacing.

In FIG. 3, the control surface 22 provides a 9430-cent pitch range (nearly eight octaves) when the right-to-left finger positions are interpreted as pitch with standard music keyboard pitch spacing. The frame 21 is approximately the same size as a large (concert grand) music keyboard. The pattern drawn on the frame 23 serves as a pitch reference; the pattern repeats nearly eight times, corresponding to the nearly eight-octave range assuming standard music keyboard pitch spacing.

Figure 4:
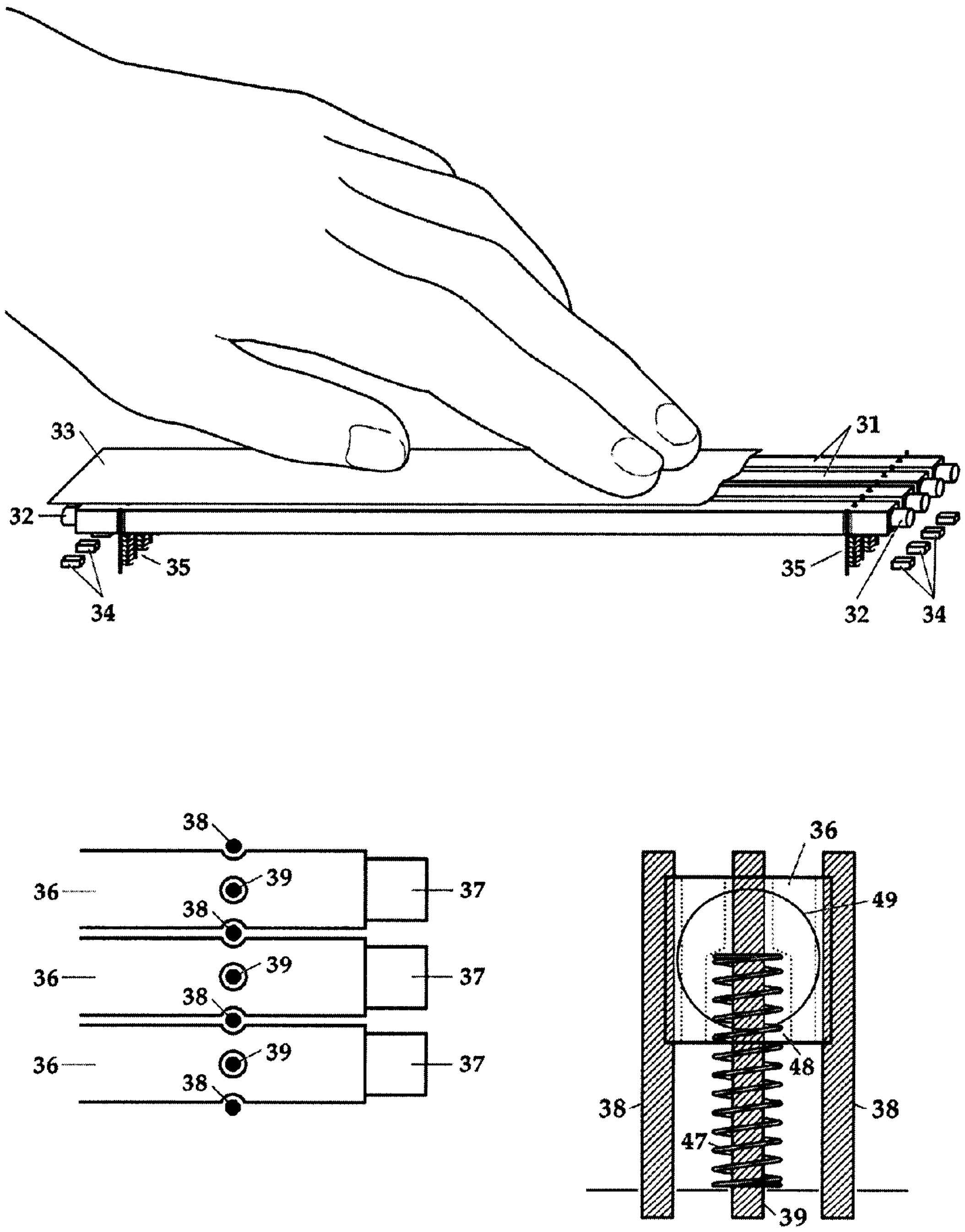
FIG. 4—Configuration of rods, magnets, springs, and sensors in the control surface according to a preferred embodiment of the present invention.

FIG. 4 shows internal mechanics of the Continuous Music Keyboard. The control surface is covered with a synthetic velvet cloth 33. The performer's fingers press down on this cloth. An array of thin rods 31 is under the control surface. These rods are narrower than a finger's width. Magnets 32 are attached to both ends of each rod, and corresponding Hall-Effect sensors 34 are mounted to the chassis. The rods are suspended on springs 35 and move up and down on metal posts.

The top view of ends of rods 36 shows the arrangement of magnets 37 and posts. The posts are in two groups; between rods posts 38 and through rod posts 39. The through rod posts 39 each have a spring around them, not visible in this view. The rods and the mounting hardware are symmetric; both ends of the rods have this same physical arrangement.

The end-on view of a rod 36 shows the between rods posts 38 at either side of the rod, and the through rod post 39. A spring 47 is mounted around each through rod post 39. The rod 36 is manufactured to accommodate the spring; when the rod 36 is fully depressed, the spring completely fits in the rod's tapered hole 48. The magnet 49 is seen end-on in this view.

Figure 5:
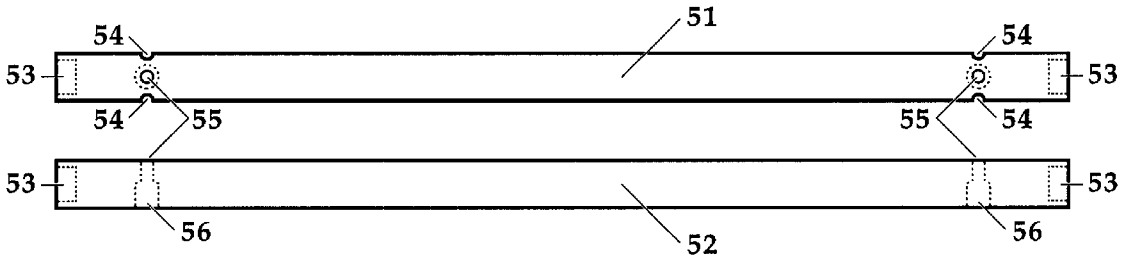
FIG. 5—Top and side view of a single rod according to a preferred embodiment of the present invention.

FIG. 5 is a top view 51 and a side view 52 of a single rod. The rod is machined aluminum, with two mounting holes for magnets 53 at each end, four indents 54 for the posts between neighboring rods, and two holes 55 for the posts through the rod. The holes 55 are wider at on the bottom of the rod 56 than on the top, so that the spring can fit into the rod when the rod is fully depressed. This provides protection for the spring if the performer applies excessive finger pressure to the rod.

Figure 6:
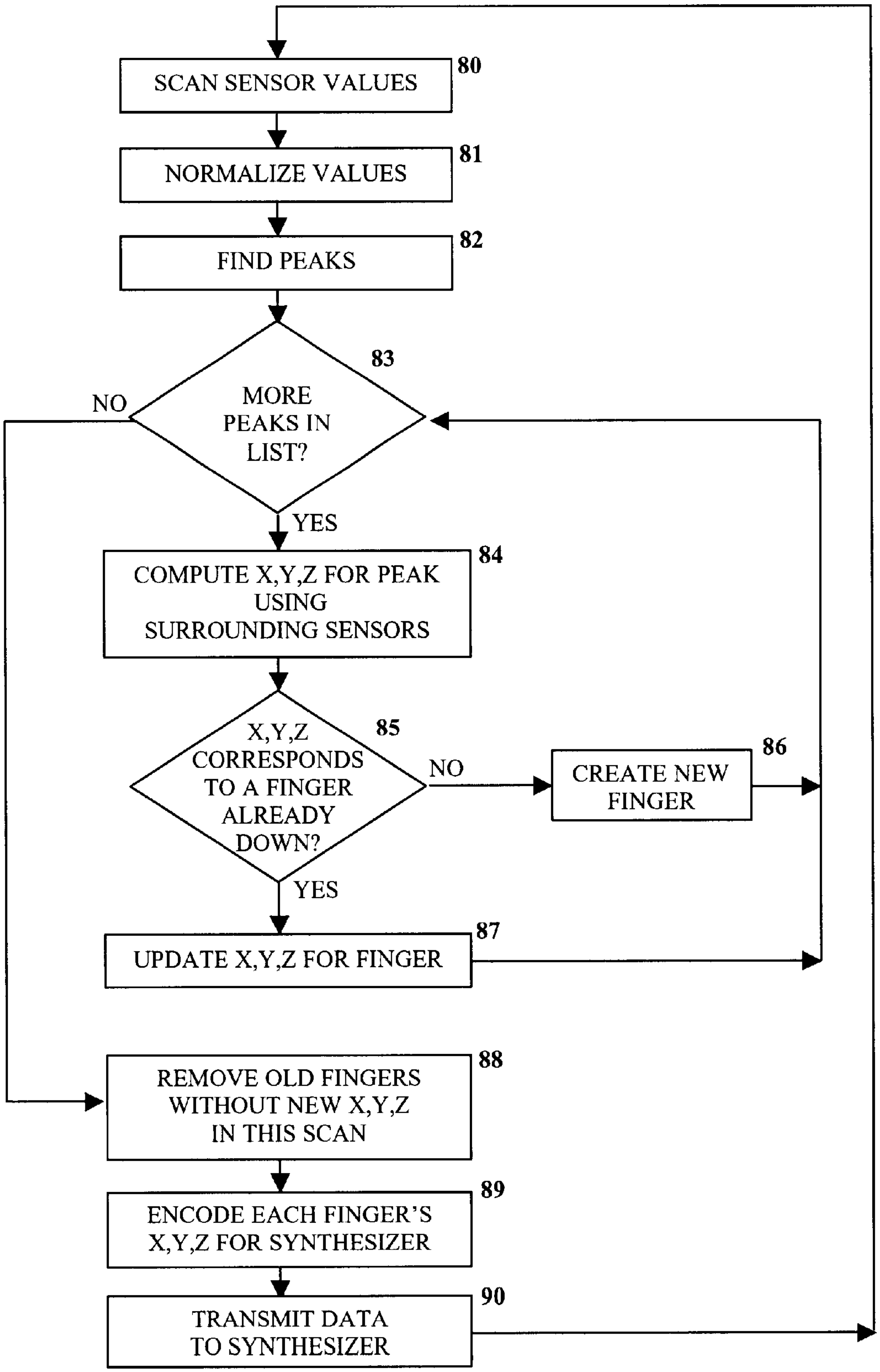
FIG. 6—A flow chart of software for controlling the control surface according to a preferred embodiment of the present invention.

FIG. 6 is a flow chart representation of the software associated with the Continuous Music Keyboard. The software uses sensor values to identify the left-to-right and front-to-back position, and pressure, of each finger on the control surface; it encodes this position and pressure information to control standard music synthesizers.

The software tracks each finger as the fingers move on the control surface. In act 80, the sensor value from the Continuous Music Keyboard are inputted. In a preferred embodiment, a full scan of the sensor values occurs every four milliseconds. Next, in act 81 the values inputted are normalized to account for differences in range and magnitude of individual sensors. After the sensor values are normalized, peak values are identified and formulated in a list in act 82. The process repeats for all the peaks in the list in act 83. For each peak, the software t computes 84 the right-to-left position (X value), the front-to-back position (Y value), and the pressure (Z value) corresponding to the peak. Details of act 84 are further described with reference to FIGS. 7, 9, and 10 below. In act 85, the XYZ value is then compared to the predicted XYZ value of all the fingers that were found in the previous scan of the sensors. The predicted XYZ is based on the previous position and trajectory of each finger. Details of act 85 are further described with reference to FIG. 11. If the new XYZ value does not correspond to any predicted value, a new finger started pressing on the control surface is indicated in act 86. If the new XYZ value corresponds to one of the predicted values, this indicates a new XYZ for that finger. The finger position is updated, and a new projected value is computed for use in the next scan in act 87.

After all the peaks are processed in acts 83–87, fingers that had no new XYZ values corresponding to predicted values are eliminated in act 88. These are fingers that were lifted from the control surface during this scan. The XYZ for each finger is then encoded for the synthesizer in act 89. Most commonly the right-to-left position is encoded as pitch information, but it could be encoded to control some other aspect of sound synthesis. Most commonly the pressure encoded as dynamic (volume) information, but it could be used to control some other aspect of synthesis. Most commonly the front-to-back is encoded as some timbre control (such as filter cutoff, or morphing control). Finally all the data is sent to the synthesizer as a high-speed MIDI stream in act 90. Then the scanning cycle repeats with a new scan of the sensor values in act 80.

Figure 7:
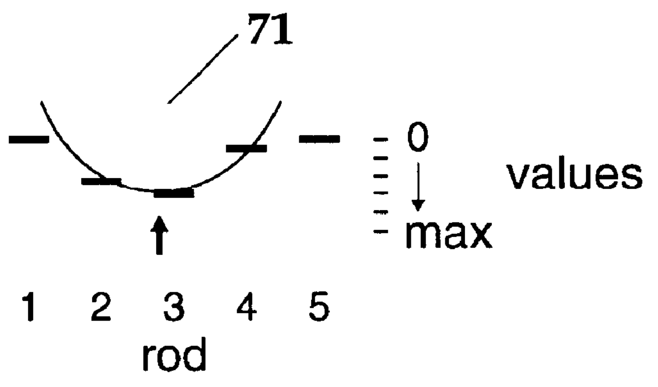
FIG. 7—A graphical representation of the calculation of a parabola according to a preferred embodiment of the present invention.
Figure 7:
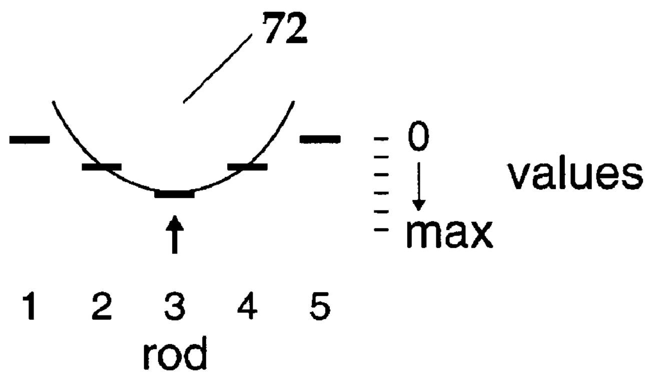
Figure 7:
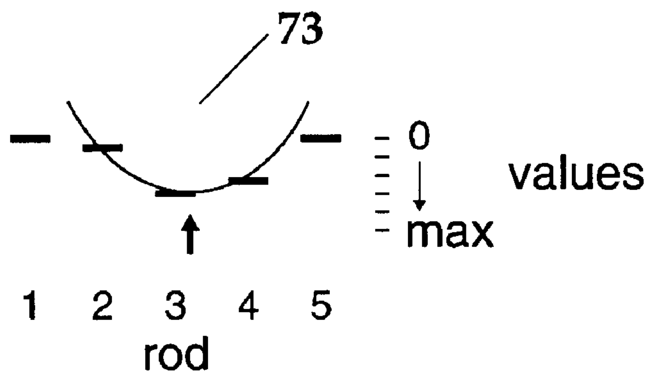

FIG. 7 shows how the Continuous Music Keyboard can find right-to-left positions that are much more accurate than the width of a rod. Assume the center rod (rod 3) in FIG. 7 is a peak found in act 82 of FIG. 6; the discussion that follows describes details of computations in 84 of FIG. 6. First, a rod value for the center rod (rod 3 in FIG. 7) and the two neighboring rods (rods 2 and 4 in FIG. 7) is computed. The rod value is the sum of both normalized values from the sensors at each end of the rod. Next, a vertical parabola is drawn through the three rod values (2, 3, and 4 in FIG. 7). The minimum point of this parabola corresponds to the finger pressure and right-to-left position. As shown in FIG. 7, the vertical location of the minimum point corresponds to the figure pressure on the control surface and the horizontal location corresponds to the right-to-left position. This method can detect slight variations in finger position, to the left 71, straight on 72, or to the right 73 of the center rod.

This present method of drawing a parabola through rod values computes a more accurate finger pressure than the previously published method of direct summation of normalized sensor values of all sensors on rods 2, 3, and 4. Also, the present method of drawing a single parabola through rod values provides a more accurate right-to-left estimate at low finger pressures than previously published methods. It is less susceptible to the interacting magnetic forces of neighboring magnets than the previously published method of drawing parabolas through the normalized sensor values at one end of the rods.

Figure 8:
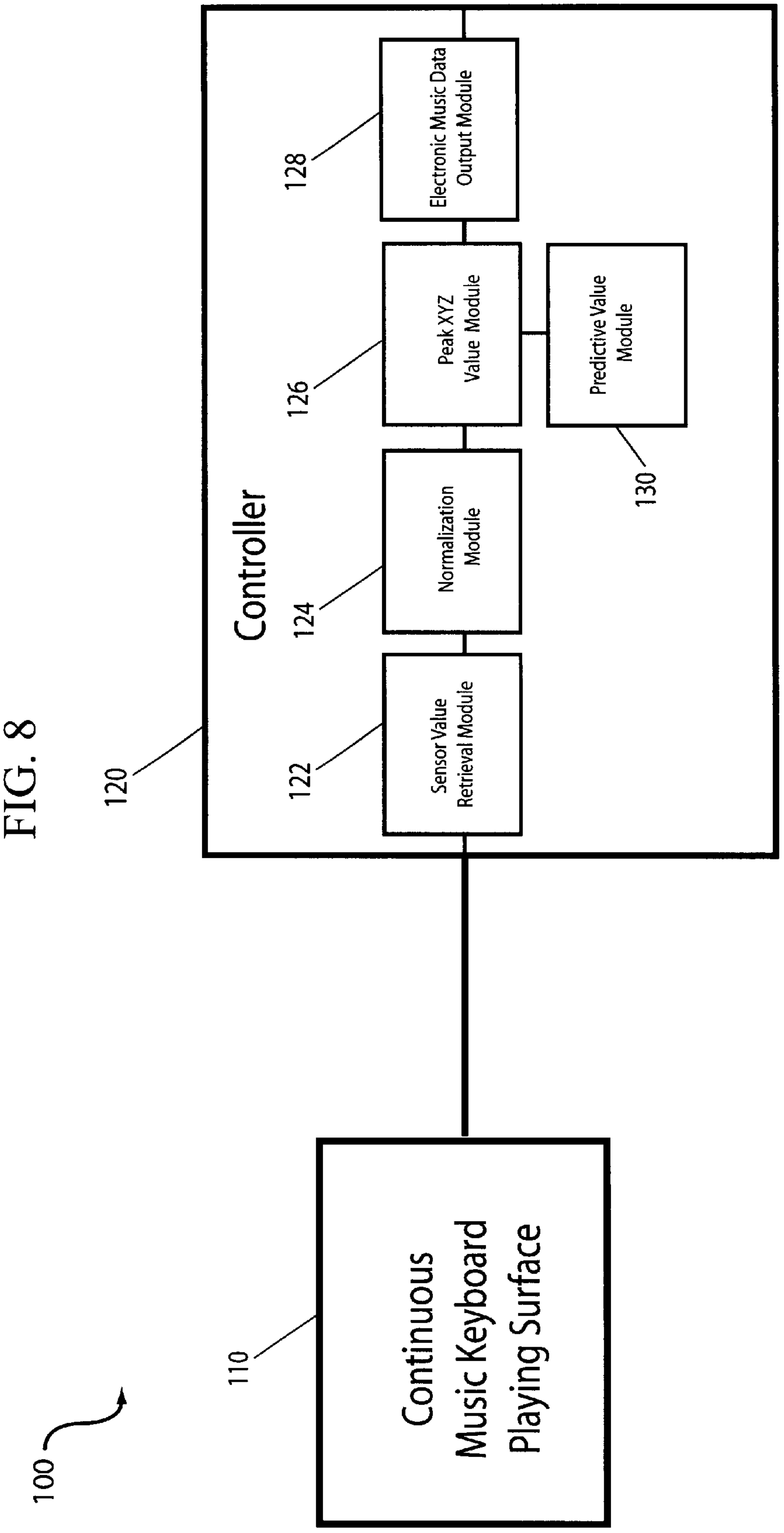
FIG. 8—A block diagram of a system for controller a control surface according to a preferred embodiment of the present invention.

As shown in FIG. 8, the continuous music keyboard system 100 may comprise a continuous music keyboard playing surface 110 coupled with a controller 120. The controller 120 operates using the software described in FIG.

6. One skilled in the art would appreciate that there are numerous different methods in which the software may be implemented on a hardware device. In one embodiment of the controller 120, several software modules may be designed to perform specific tasks. As used herein, the controller 120 refers to any assembly of electronics that may analyze generated sensor values. In a preferred embodiment, a sensor value retrieval module 122 may scan the sensor values from the playing surface 110. These retrieved values may then be normalized through a normalization module 124. Next, Peak XYZ Value Module 126 may calculate the peak XYZ value from the received the normalized values. The Peak XYZ Value Module 126 may also communicate with a Predictive Value Module 130, which can be used to predict where a next finger position is likely to occur. This information may be used to determine if a new finger has been placed on the playing surface, or if is simply a movement of a finger that has already pressing down on the playing surface. These values assessed by the Peak XYZ Value Module 126 may be sent to an electronic music data output module 128 which may transmit data to a synthesizer. As one skilled in the art would appreciate, the functions of the controller 120 may be accomplished through the use of a different number and arrangement of software modules.

Figure 9:
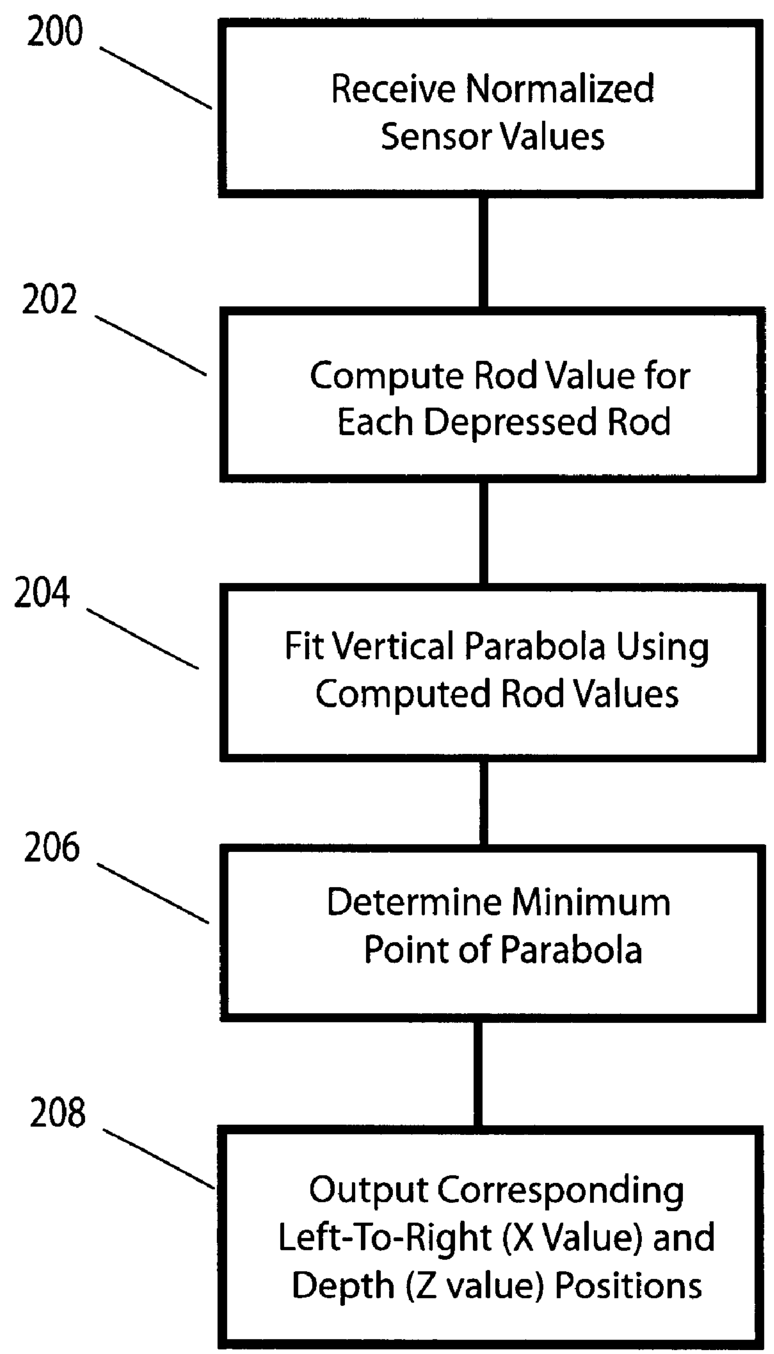
FIG. 9—A flowchart for software for generating left-to-right (X value) and depth (Z value) coordinates according to a preferred embodiment of the present invention.

FIG. 9 graphically depicts an exemplary method of determining the Left-To-Right (X Value) Position and Depth (Z Value) of a depression on a control surface, which was also disclosed above. In act 200, normalized sensor values are received. Next, the sum of the normalized sensor values from each end of the rod is computed for each depressed rod in act 202. Next, a vertical parabola is fitted using the computed rod values as data points in act 204. The minimum point of the vertical parabola is then assessed in act 206. The vertical component of the parabola corresponds to the Z Value; the horizontal component corresponds to the X Value; the horizontal component corresponds to the X Value. The corresponding Left-To-Right (X value) and Depth (Z Value) Positions are then outputted in act 208.

Figure 10:
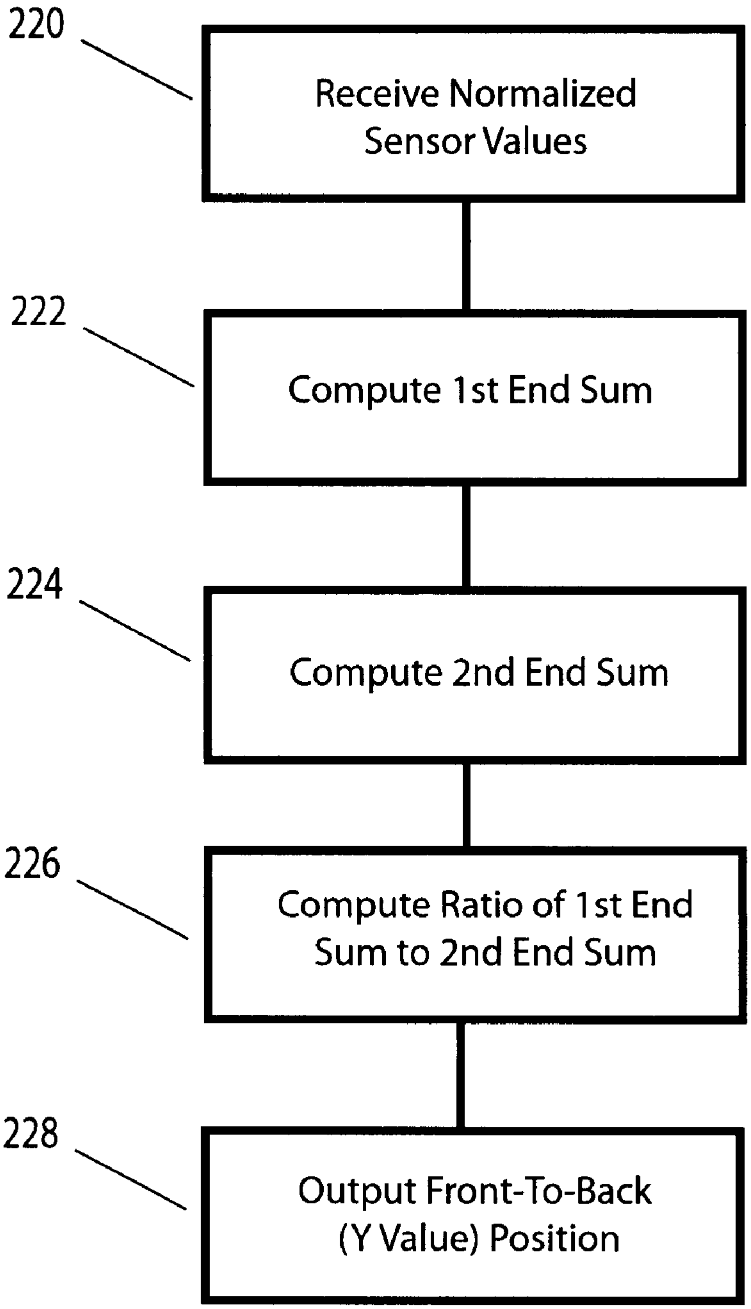
FIG. 10—A flow chart for software for generating front-to-back (Y value) coordinates according to a preferred embodiment of the present invention.

FIG. 10 graphically depicts an exemplary method of determining the Front-To-Back (Y Value) Position of a depression on the control surface, which was also disclosed above. In act 220, normalized sensor values are received. Next, in act 222, the sum of normalized sensor values at the same end of neighboring rods is computed for a first side of the depressed rods. As noted in FIG. 7, this typically comprises three rods. However, normalized sensor for more or less rods may be utilized. This process is repeated in act 224 for the second side of the depressed rods. In act 226, the ratio of the first end sum computed in act 222 to the second end sum computed in act 224 is calculated. A corresponding Front-To-Back (Y Value) Position is then outputted in act 228.

Figure 11:
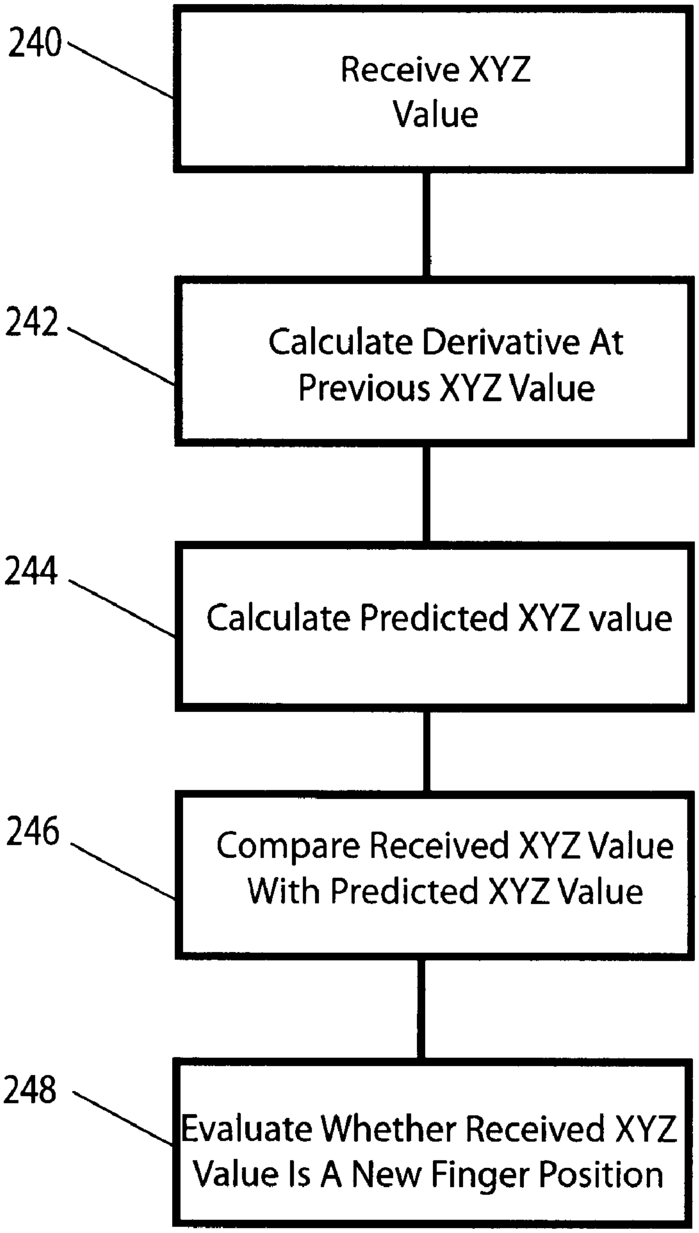
FIG. 11—A flow chart for software for evaluating received and predicted coordinate values according to a preferred embodiment of the present invention.

The evaluation of whether an X,Y,Z coordinate corresponds to a finger that is already down, depicted in FIG. 6 as act 85, is further graphically depicted in FIG. 11. In act 240, a computed XYZ value is received. Next, the three-dimensional derivative is computed in act 242. Here, the trajectory, including the speed and direction of a finger at the previous XYZ value is calculated. From this trajectory, a predicted XYZ value is generated in act 244. This predicted XYZ value is then compared with the actual XYZ in act 246. The comparison of where the finger is predicted to be located with the actual XYZ value is then used to determine if the received XYZ value is a new finger position in act 248.

I claim:

1. A continuous keyboard system, comprising:
- a flat control surface;
- a plurality of rods proximate to said flat control surface, said rods connected with springs mounted to a chassis;
- a plurality of first end magnets, each of said first end magnets coupled to a first end of a rod;
- a plurality of second end magnets, each of said second end magnets coupled to a second end of a rod;
- a plurality of first end Hall-Effect sensors responsive to the movement of said first end magnets;
- a plurality of second end Hall-Effect sensors responsive to the movement of said second end magnets; and
- a controller operable to receive sensor values from said first and second end Hall-Effect sensors, generate coordinates corresponding to a depression in said flat control surface and predict a potential new position of said depression in said flat control surface;
- wherein the potential new position of said depression is calculated using at least one set of previously generated coordinates and a computed derivative of the at least one set of previously generated coordinates.

2. The continuous keyboard system of claim 1, wherein said springs extend into holes in said rods.

3. The continuous keyboard system of claim 1, wherein each rod is connected to the chassis with two springs.

4. The continuous keyboard system of claim 1, wherein said first and second end Hall-Effect sensors are mounted on said chassis.

5. The continuous keyboard system of claim 1, wherein a first end magnet, a second end magnet and a rod are aligned along a longitudinal axis, and said first and second end Hall-Effect sensors are aligned parallel to a said longitudinal axis.

6. The continuous keyboard system of claim 1, wherein a first end magnet, a second end magnet and a rod are aligned along a longitudinal axis, and said first and second end Hall-Effect sensors are aligned perpendicular to a said longitudinal axis.

7. The continuous keyboard system of claim 1, further comprising a removable cover mounted on a bracket.

8. The continuous keyboard system of claim 1, further comprising a synthetic velvet cover.

9. The continuous keyboard system of claim 1, further comprising a pitch reference pattern proximate to said flat control surface.

10. The continuous keyboard system of claim 1, wherein said first end magnets and Hall-Effect sensors are located proximate to the front of said flat control surface and said second end magnets and Hall-Effect sensors are located proximate to the back of said flat control surface.

11. A method for controlling a continuous keyboard system, comprising the acts of:
- providing a flat control surface;
- providing a plurality of rods coupled with magnets and proximate to said flat control surface;
- providing a plurality of Hall-Effect sensors operable to output sensor values responsive to movement of at least one of said magnets;
- receiving a plurality of sensor values;
- identifying a three-dimensional coordinate corresponding to a depression in the flat surface;
- calculating a predicted three-dimensional coordinate using at least one three-dimensional coordinate and a computed derivative of the at least one three-dimensional coordinate; and comparing an identified three-dimensional coordinate with a predicted three-dimensional coordinate.

12. The method of controlling a continuous keyboard system of claim 11, further comprising the act of normalizing received sensor values.

13. The method of controlling a continuous keyboard system of claim 11, further comprising the act of determining whether said three-dimensional coordinate constitutes a new depression in a flat surface.

14. The method of claim 11, wherein the act of identifying said three-dimensional coordinate corresponding to a depression in a flat surface comprises the acts of:

computing a sum of values from sensors at each end of at least one of said plurality of rods;

calculating a parabola from said sum of values from sensors at each end of at least one of said plurality determining a minimum point on said parabola; and identifying X-plane and Z-plane coordinates corresponding to said minimum point on said parabola.

15. The method of claim 11, wherein the act of identifying said three-dimensional coordinate corresponding to a depression in a flat surface comprises the acts of:

computing a sum of a first series of sensor values, said first series of sensor values corresponding to magnets proximate to a first end of a flat control surface;

computing a sum of a second series of sensor values, said second series of sensor values corresponding to magnets proximate to a second end of said flat control surface;

computing a ratio of said sum of a first series of sensor values to said sum of second series of sensor values; and identifying a Y-plane coordinate.

16. The method of claim 11, wherein the act of identifying said three-dimensional coordinate corresponding to a depression in a flat surface comprises the acts of:

computing a sum of a first series of sensor values, said first series of sensor values corresponding to magnets proximate to a first end of a flat control surface;

multiplying said sum of a first series of sensor values by a fractional exponent;

computing a sum of a second series of sensor values, said second series of sensor values corresponding to magnets proximate to a second end of said flat control surface;

multiplying said sum of a second series of sensor values by a fractional exponent;

computing a ratio of said sum of a first series of sensor values multiplied by a fractional exponent to said sum of second series of sensor values multiplied by a fractional exponent; and identifying a Y-plane coordinate.

17. A method for controlling a continuous keyboard system, comprising the acts of:

providing a plurality of rods coupled with magnets;

providing a plurality of Hall-Effect sensors operable to output sensor values responsive to the movement of at least one of said magnets;

receiving a plurality of sensor values;

computing a plurality of rod values;

calculating a parabola from said plurality of rod values;

determining a minimum point on said parabola;

computing a sum of a first series of sensor values, said first series of sensor values corresponding to magnets proximate to a first end of a flat control surface;

multiplying said sum of a first series of sensor values by a fractional exponent;

computing a sum of a second series of sensor values, said second series of sensor values corresponding to magnets proximate to a second end of said flat control surface;

multiplying said sum of a second series of sensor values by a fractional exponent; and computing the ratio of said sum of a first series of sensor values multiplied by a fractional exponent to said sum of second series of sensor values multiplied by a fractional exponent.

18. The method of claim 17 further comprising the act of outputting a coordinate position.

19. The method of claim 18 wherein said coordinate position comprises a Y-plane coordinate.

20. A continuous keyboard system, comprising:

a flat control surface;

a plurality of rods proximate to said flat control surface;

a plurality of first end magnets, each of said first end magnets coupled to a first end of a rod;

a plurality of second end magnets, each of said second end magnets coupled to a second end of a rod;

means for generating voltages in response to movements of said first end and second end magnets;

means for receiving the voltages;

means for normalizing the voltages;

means for generating coordinates corresponding to a depression in said flat control surface; and means for predicting a potential new position of said depression in said flat control surface;

wherein the potential new position of said depression is calculated using at least one set of previously generated coordinates and a computed derivative of the at least one set of previously generated coordinates.

* * * * *